United States Patent
Chandraiah et al.

(12)

(10) Patent No.: US 6,485,193 B1
(45) Date of Patent: Nov. 26, 2002

(54) APPARATUS FOR CLEANING AN OPTICAL FIBER RIBBON

(75) Inventors: Vidyananda Bangalore Chandraiah, Lawrenceville, GA (US); Kenneth Wade Jackson, Snellville, GA (US)

(73) Assignee: Fitel USA Corporation, Norcross, GA (US)

( * ) Notice: Subject to any disclaimer, the term of this patent is extended or adjusted under 35 U.S.C. 154(b) by 0 days.

(21) Appl. No.: 09/426,287

(22) Filed: Oct. 25, 1999

(51) Int. Cl.7 .............................................. G02B 6/38
(52) U.S. Cl. ............................ 385/75; 385/85; 15/97.1
(58) Field of Search ............................. 385/75, 88, 90, 385/115, 120, 147, 85, 114; 15/104.94, 118, 1.51, 97.1, 100, 102, 103.5; 65/503

(56) References Cited

U.S. PATENT DOCUMENTS

| | | | | |
|---|---|---|---|---|
| 3,882,568 A | * | 5/1975 | Hill .............................. | 15/308 |
| 5,056,180 A | * | 10/1991 | Stanton ..................... | 15/104.94 |
| 5,056,185 A | * | 10/1991 | Schotter ....................... | 15/302 |
| 5,524,167 A | * | 6/1996 | Ewert et al. ................. | 385/137 |
| 5,681,417 A | * | 10/1997 | Jacobs ......................... | 156/344 |
| 6,167,584 B1 | * | 1/2001 | Nassiri ..................... | 15/104.94 |
| 6,195,827 B1 | * | 3/2001 | Dumitriu .................... | 15/1.51 |

* cited by examiner

Primary Examiner—Cassandra Spyrou
Assistant Examiner—Euncha Cherry

(74) Attorney, Agent, or Firm—Thomas, Kayden, Horstemeyer & Risley

(57) ABSTRACT

The present invention provides an apparatus for cleaning an optical fiber ribbon without splitting the ribbon. The apparatus comprises a first element that has a channel formed therein, which preferably has a width that is substantially equal to the width of an optical fiber ribbon. A ribbon is cleaned by disposing it in the channel and by pulling it through the channel while applying a force to the top surface of the ribbon. The force may be applied, for example, by a user who applies a cleaning cloth to the top surface of the ribbon as it is pulled through the channel. The contact between the channel, the cleaning device and the exterior surface of the ribbon effectuates removal of foreign material from the exterior surface of the ribbon. In accordance with the preferred embodiment, the apparatus further comprises a second element. The second element includes a bottom surface that is disposed over the channel when the first and second elements are placed in their operative positions. In order to clean a ribbon, the ribbon is pulled through the channel in a direction parallel to the length-wise direction of the ribbon. As the ribbon is pulled through the channel, the channel and the bottom surface of the second element wipe the exterior surface of the ribbon and thereby remove unwanted particles or matter from the exterior surface of the ribbon. The channel and the bottom surface of the second element maintain the ribbon in a substantially coplanar configuration as the ribbon is being pulled through the channel, thereby preventing the ribbon from being split during the cleaning process.

11 Claims, 4 Drawing Sheets

APPARATUS FOR CLEANING AN OPTICAL FIBER RIBBON

TECHNICAL FIELD OF THE INVENTION

The present invention relates to cleaning optical fiber ribbons and, more particularly, to an optical fiber ribbon cleaning apparatus that cleans optical fiber ribbons while ensuring that the ribbons remain flat so that the individual optical fibers of the ribbon are not separated during the cleaning process.

BACKGROUND OF THE INVENTION

Optical fibers are widely used as a signal transmission media. Their popularity stems from both their small size and from their large bandwidth capability, which is orders of magnitude greater than electrical conductors. However, optical fibers are mechanically fragile and exhibit low strain fracture resistances under tensile loading. In addition, optical fibers cannot be sharply bent. This is because the propagation of light through optical fibers can be seriously degraded by too sharp a bend, and the fiber itself can be fractured by such a bend. The fibers, when assembled into a cable, must be capable of withstanding tensile loads and bending stresses caused when the cable is pulled along its routing and through turns.

In order to achieve high fiber count cables with high fiber packing densities the optical fibers are produced and then bonded together so as to provide a fiber array or ribbon containing multiple fibers. The ribbon may have any number of fibers, but the fibers are commonly assembled in a co-planar array having four, six, eight, twelve, sixteen, twenty-four, or more fibers. A twelve-fiber ribbon currently is the most widely used. As the use of such ribbons increases, the number of fibers in the array is also expected to increase, and cables or ribbons with hundreds or thousands of individual optical fibers are possible and even likely to appear in he future. Such ribbons and a method of producing them are described, respectively, in U.S. Pat. No. 4,900,126 to Jackson et al. and U.S. Pat. Nos. 4,980,007 and 5,076,881, both to Ferguson.

As discussed in these patents, the optical fibers comprising a ribbon are typically color-coded and held together by a matrix, which secures the fibers in the desired planar array, or ribbon, of optical fibers. The matrix is typically made from an ultra violet light-curable urethane acrylate and is coated with a cable-filling compound. The ribbons are typically disposed within a tube-like covering and are encapsulated with a grease-like cable filling compound that guards against water ingress and migration. Consequently, dirt, dust, and other contaminants easily adhere to a ribbon coated with the compound. Therefore, the cable-filling compound is wiped from the ribbon when the optical fibers are spliced, or when the ribbon is placed within an environment where it is undesirable to have grease present.

The current technique used for removing the cable-filling compound from the ribbon often involves soaking the ribbon in a cleaning solution, which typically is alcohol or citrus-based, and then wiping the ribbon with a cloth to remove the cable-filling compound from the ribbon. This process of cleaning a ribbon tends to be messy because the cleaning solution and/or the cable-filling compound may drip onto the floor or onto the person cleaning the ribbon. Furthermore, cleaning a ribbon involves the use of large quantities of consumable wiping clothes.

Furthermore, this cleaning process may damage the ribbon. When wiping the ribbon by hand, the ribbon may be twisted or bent, or both, thereby resulting in the accidental splitting of the ribbon. The task of cleaning a ribbon without accidentally splitting it is even more difficult for wider ribbons and in congested spaces such as manhole.

Accordingly, a need exists for an apparatus for removing the cable-filling compound, or other materials, from an optical fiber ribbon quickly and easily while also preventing the ribbon from being damaged.

SUMMARY OF THE INVENTION

The present invention provides an apparatus for cleaning an optical fiber ribbon without splitting the ribbon. The apparatus comprises a first element that has a channel formed therein, which preferably has a width that is substantially equal to the width of an optical fiber ribbon. The channel defines a flat surface for receiving an optical fiber ribbon to be cleaned. A ribbon is cleaned by disposing it in the channel and by pulling the ribbon through the channel while applying a force to the top surface of the ribbon to thereby maintain the ribbon flat against the channel. For example, a user applies a cleaning device, such as a sponge or cleaning cloth, to the top surface of the ribbon as it is pulled through the channel in a direction parallel to the lengthwise direction of the ribbon. The contact between the channel, the cleaning device and the exterior surface of the ribbon effectuate removal of foreign material from the exterior surface of the ribbon.

In accordance with the preferred embodiment of the present invention, the apparatus further comprises a second element. The second element includes a bottom surface that is disposed over the channel formed in the first element when the first and second elements are placed in their respective operative positions. In order to clean a ribbon, the ribbon is disposed flatly in the channel of the first element and the second element is placed in contact with the first element such that the bottom surface of the second element covers the ribbon. The ribbon, or a section of the ribbon, is then pulled through the channel in a direction parallel to the length-wise direction of the ribbon. As the ribbon is pulled, the channel of the first element and the bottom surface of the second element cooperate to perform a wiping action that removes unwanted particles or matter from the outer surface of the ribbon. The channel of the first element and the bottom surface of the second element maintain the ribbon in a flat configuration as it is being pulled, thereby preventing the ribbon from splitting.

The apparatus preferably also comprises a coupling device for coupling the first and second elements together. The coupling device allows the apparatus to be easily opened and closed to thereby allow a ribbon to be easily placed in and removed from the ribbon cleaning apparatus of the invention. Preferably, the ribbon cleaning apparatus is a hand-held apparatus that can be held in one hand by a user while the user pulls the ribbon with the other hand in order to clean the ribbon. Preferably, the channel is integrally formed in the first element and the first and second elements are comprised, at least partially, of a conformable material that conforms to the exterior surface of the ribbon during the cleaning process.

These and other features and advantages of the present invention will become apparent from the following description, drawings and claims.

DETAILED DESCRIPTION OF THE INVENTION

Figure 1:
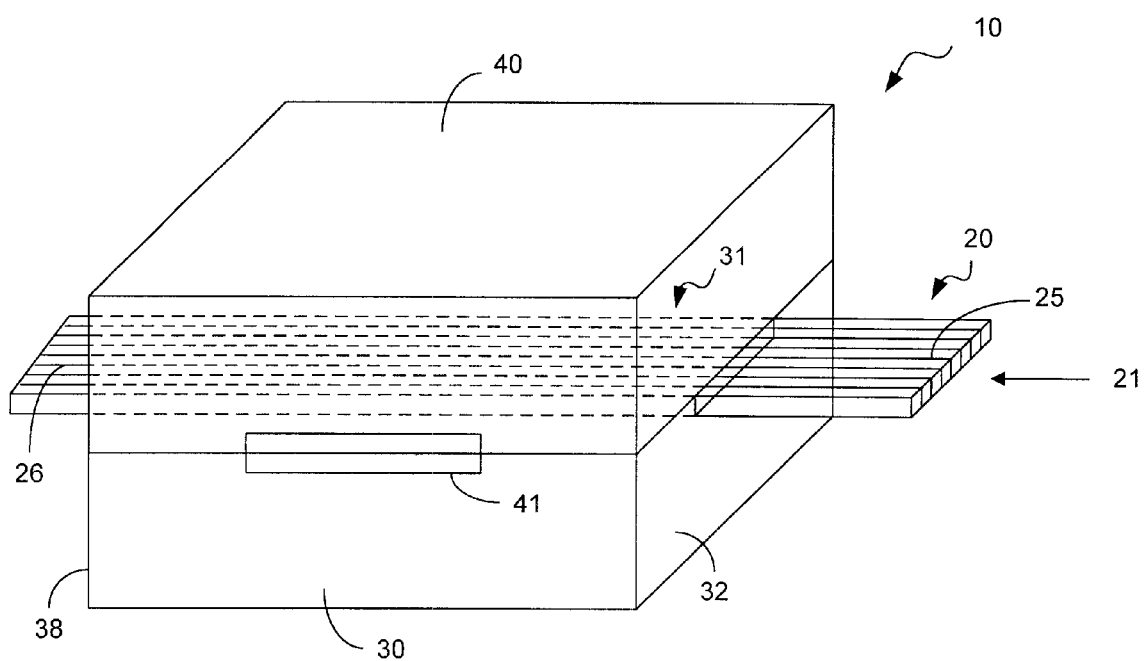
FIG. 1 is a perspective view of a first embodiment of the optical fiber ribbon cleaning apparatus of the present invention having an optical fiber ribbon to be cleaned disposed therein.

FIG. 1 is a perspective view of the optical fiber ribbon cleaning apparatus 10 of the present invention in accordance with the preferred embodiment, which shows an optical fiber ribbon 20 being cleaned. The motion of the ribbon 20 relative to the apparatus 10 is indicated by arrow 21. An uncleaned portion 25 of the ribbon 20 enters the channel 31 at the front end 32 of the first element 30. The channel 31 extends through the first element 30 from the front end 32 of the first element 30 to the rear end 38 of the first element 30. The cleaned portion 26 of the ribbon 20 emerges through the rear end 38 of the first element 30.

The apparatus 10 is shown in FIG. 1 in the closed, or operative, position. In this position, the lower surface of the second element 40 is disposed over the channel 31 formed in the first element 30. The lower surface of the second element 40 and the channel 31 formed in the first element 30 cooperate to perform a wiping action on the ribbon 20, as discussed below in more detail. The lower surface of the second element 40 includes two different surface areas, as discussed below in more detail.

The first element 30 preferably is coupled to the second element 40 by a coupling device 41, such as a hinging mechanism, for example. The coupling device 41 is not critical to the present invention, but rather, is preferred because it enables a ribbon to be easily placed in, cleaned by, and removed from the apparatus 10 by a user (not shown). For example, in order to place the apparatus 10 in the open position, a user simply applies an upwardly-directed force to the side of the second element 40 opposite the side of the second element 40 to which the coupling device 41 is attached. The user then disposes the ribbon in the channel 31 and closes the apparatus 10 to place it in the operative position shown in FIG. 1. The user then pulls the ribbon 20 in the direction indicated by arrow 21 to thereby clean the ribbon 20. The user then simply opens the apparatus 10 in the aforementioned manner and removes the ribbon 20 from the channel 31.

The coupling device 41 also serves to maintain the first and second elements 30 and 40, respectively, in their relative positions in both the operative and inoperative modes. If the apparatus 10 does not comprise the coupling device 41, the apparatus 10 could be maintained in the operative position by some other force, such as, for example, gravity, a magnetic field, a force exerted by the user, etc. Those skilled in the art will understand that a variety of coupling mechanisms are known that are suitable for this purpose. Therefore, in the interest of brevity, a list of coupling mechanisms that are suitable for this purpose will not be provided herein. To provide an example of another suitable coupling device 41, the apparatus 10 could be comprised of, at least partially, a magnetic material, which would be located at some location on each of the first and second elements 30 and 40. In this case, the magnetic material located on the first element 30 would have a polarity that is opposite the polarity of the magnetic material located on the second element 40 so that the first and second elements 30 and 40 are magnetically attracted to each other. The magnetic force preferably would be sufficient to hold the first and second elements together when cleaning a ribbon, but not so strong that it is difficult for a user to pull them apart.

Figure 2:
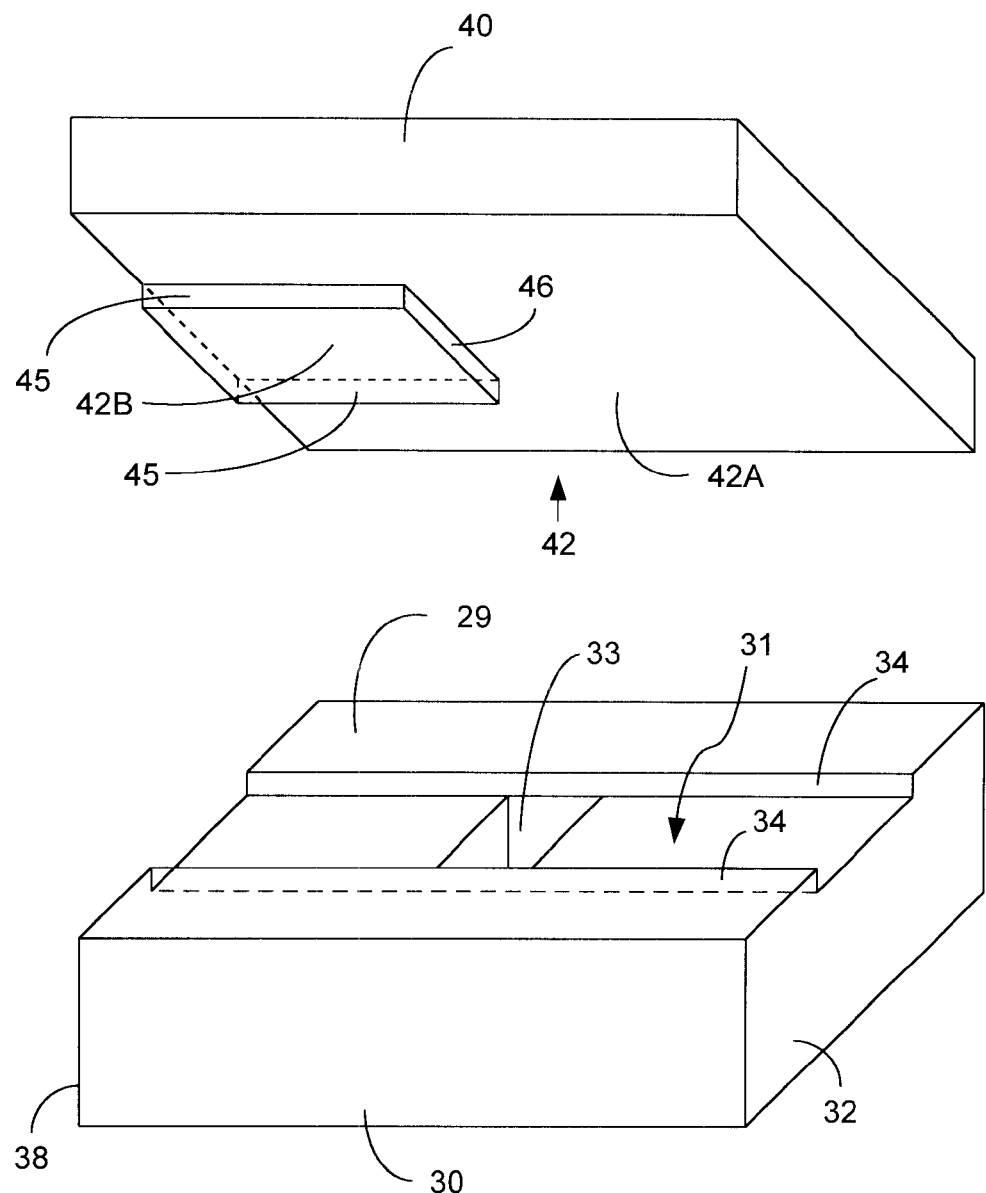
FIG. 2 is a partially exploded perspective view of the optical fiber ribbon cleaning apparatus of the present invention shown in FIG. 1.
Figure 3:
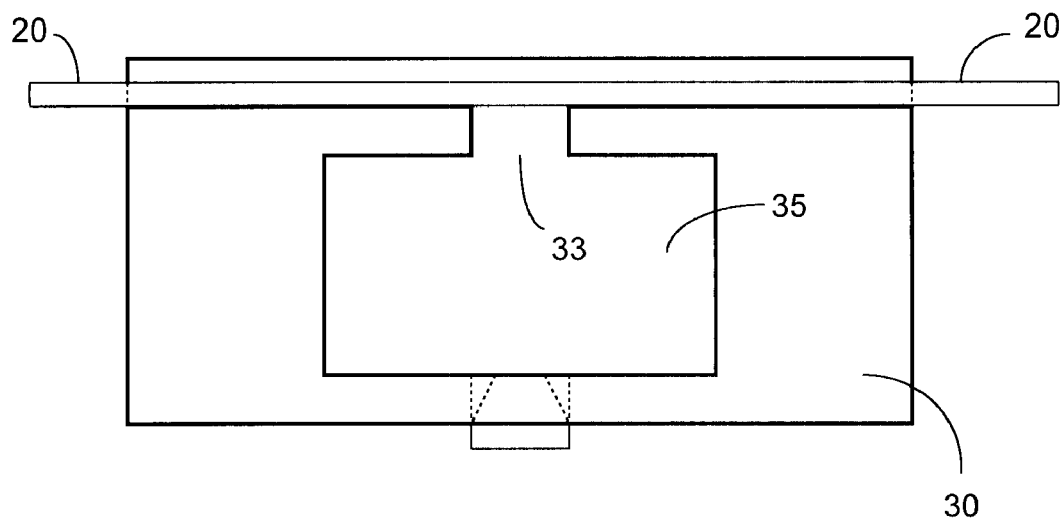
FIG. 3 is a cross sectional side view of the first element of the optical fiber ribbon cleaning apparatus of the present invention shown in FIG. 1.

FIG. 2 is a perspective view of the first element 30 and of the second element 40 of the optical fiber ribbon cleaning apparatus 10 of the present invention that shows the elements 30 and 40 decoupled from each other. For simplicity, the coupling device 41 is not shown in FIG. 2. The first element 30 has a generally flat upper surface 29, which has a channel 31 formed therein. The channel 31 preferably has an opening 33 formed therein, which is in communication with a reservoir 35, as shown in FIG. 3. FIG. 3 is a cross-sectional side view of the first element 30 of the optical fiber ribbon cleaning apparatus 10 of the present invention. The opening 33 preferably extends across the width of the channel 31. The purpose for the opening 33 is to provide a passage through which material removed from the ribbon 20 during the cleaning process can pass. The reservoir 35 functions as a temporary holding container for the removed material until the reservoir 35 is emptied.

The reservoir 35 is not a necessary element of the apparatus 10, but rather, is preferred because it enables the cleaning process to be performed by a user in a clean and neat manner. The reservoir 35 prevents material from leaking or dripping onto the floor or onto the user during the cleaning process. The opening 33 simply provides a passage for the removed material from the channel 31 to the reservoir 35.

Referring again to FIG. 2, the bottom surface 42 of the second element 40 includes a non cleaning surface area 42A and a cleaning surface area 42B which protrudes therefrom. Preferably, the cleaning surface area 42B, hereinafter referred to as the cleaning structure, is formed as an integral part of the second element 40. When the first element 30 and the second element 40 are in their operative positions, as illustrated in FIG. 1, the cleaning structure 42B fits within channel 31 such that channel sides 34 of the channel 31 are in contact with sides 45 of the cleaning structure 42B. The cleaning structure 42B includes a front side, or edge, 46, which will be discussed below with reference to FIG. 5.

The surface of the channel 31 is substantially flat so that the cleaning structure 42B and the surface of the channel 31 cooperate to maintain the ribbon 20 in a substantially flat configuration as it is pulled through the channel 31. This prevents the ribbon from splitting during the cleaning process. The channel 31 of the first element 30 and the cleaning structure 42B of the second element 40, or particular portions of the channel 31 and of the cleaning structure 42B, preferably are comprised of a conformable material, i.e., a material that conforms to the surface of the optical fiber ribbon 20. The first and second elements 30 and 40 may be comprised in their entirety of the conformable material.

Optical fiber ribbons generally have exterior surface areas that have variations in them. If the channel 31, including its sides 34, and the cleaning structure 42B are rigid, all of the surface areas of the ribbon that come into contact with the channel 31, its sides 34 and the cleaning structure 42B will not be wiped due to variations in the exterior surface areas of the ribbon. However, if a conformable material is used, substantially all of the surface areas of the ribbon will be wiped clean. The entire apparatus 10 may be made of the conformable material, or only the surfaces of the apparatus 10 that perform the wiping function may be comprised of the conformable material.

It should be noted that a large number of conformable materials are suitable for this purpose. Therefore, in the interest of brevity, a list of all of the materials that are suitable for this purpose will not be provided herein. Those skilled in the art will know of various materials that can be used for this purpose. For example, silicon, rubber, thermoplastic, and polyurethane could be used for this purpose.

It should also be noted that the optical fiber ribbon cleaning apparatus 10 of the present invention may be used to clean optical fiber ribbons even without employing the second element 40. For example, a ribbon to be cleaned could be disposed in the channel 31. The user would then hold the first element 30 in the palm of one hand while using one or more fingers of the hand to apply a cleaning material or device, such as a sponge, to the top surface of the ribbon. The user would then pull the ribbon through the channel 31 with his or her other hand. The channel 31 and the cleaning device applied to the ribbon by the user will maintain the ribbon in a substantially flat position as the ribbon is pulled, thereby preventing the ribbon from splitting during the cleaning process.

Figure 4:
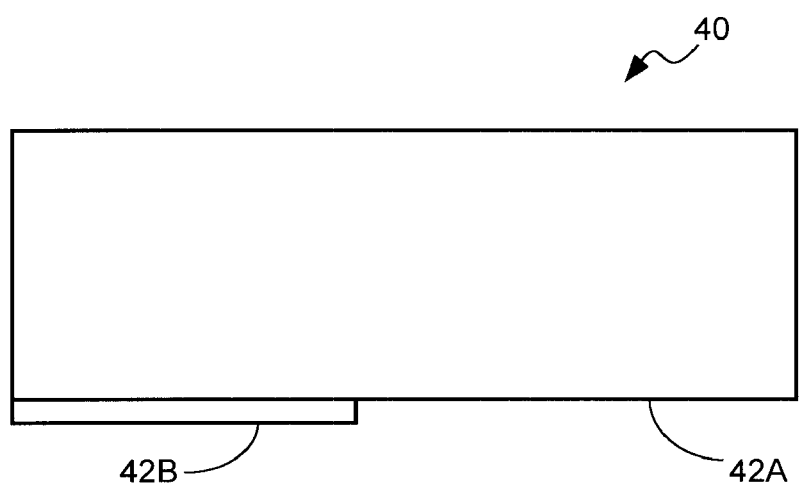
FIG. 4 is a side view of the second element of the optical fiber ribbon cleaning apparatus, which operates in conjunction with the first element shown in FIG. 3.
Figure 5:
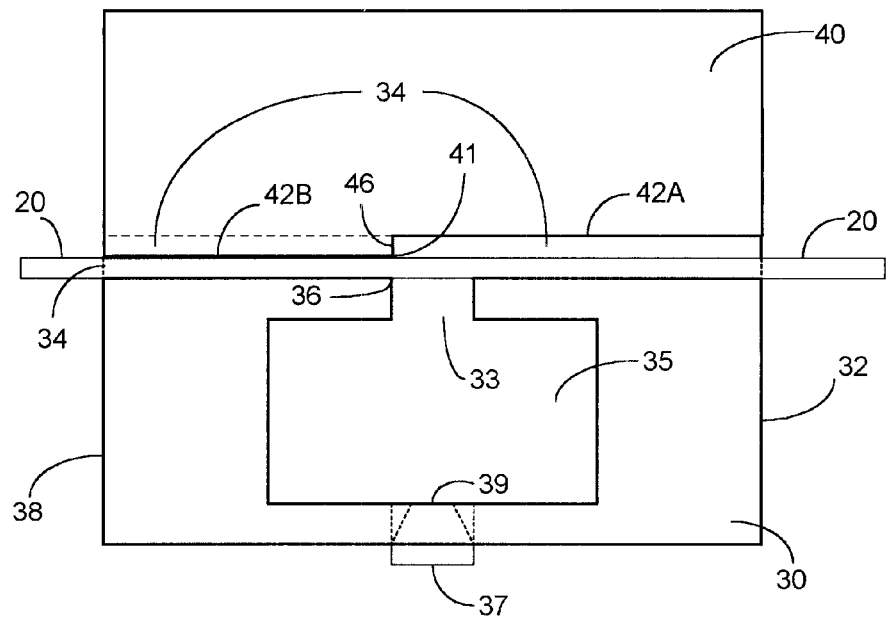
FIG. 5 is a cross-sectional side view of the optical fiber ribbon cleaning apparatus of the present invention comprising the first and second elements shown in FIGS. 3 and 4, respectively, wherein the first and second elements are in their operative positions.

FIG. 4 is a side view of the second element 40 of the optical fiber ribbon cleaning apparatus 10, which shows the different surface areas 42A and 42B of the surface 42. FIG. 5 is a cross-sectional side view of the ribbon cleaning apparatus 10 of the present invention, which shows the first and second elements 30 and 40, respectively, disposed in their operative positions. In accordance with the preferred embodiment of the present invention, the height of the sides 34 of the channel 31 is slightly greater than the thickness of the ribbon 20, and is approximately constant from the front end 32 to the rear end 38 of the first element 30. When the second element 40 is placed in the operative position with respect to the first element 30, surfaces 29 and 42A are in contact with each other, and the cleaning structure 42B is disposed within the channel 31. The sides 45 of the cleaning structure 42B are in contact with the sides 34 of the channel 31. A gap exists between the bottom of the channel 31 and the lower surface of the cleaning structure 42B. The height of the gap is less than or equal to the thickness of the ribbon 20 such that the ribbon 20 is sandwiched between these surfaces when the ribbon cleaning apparatus 10 is in the operative position. When the apparatus 10 is in the operative position, the surface 42 of the second element 40 is maintained a predetermined distance away from the ribbon 20 over a distance extending from the front end 32 of the first element 30 to the location denoted by numeral 41, which corresponds to the position of the front edge 46 of the cleaning structure 42B. From the location denoted by numeral 41 to the rear end 38 of the first element 30, the cleaning structure 42B of the second element 40 is in contact with the ribbon 20.

As the ribbon 20 is pulled through the channel 31, the edge 36 of the opening 33 formed in the channel 31 and the front edge 46 of the cleaning structure 42B are in contact with the ribbon 20 and function as wiping elements that wipe the top and bottom surfaces of the ribbon 20. The sides 34 of the channel 31 wipe the sides of the ribbon 20. This wiping action serves to wipe, or scrape, foreign material from the optical fiber ribbon 20. As the material is removed from the surface of the ribbon 20, the removed material passes through the opening 33 into the reservoir 35. Preferably, a plug 37 seals an opening 39 formed in the bottom of the reservoir 35. The reservoir 35 can be emptied by removing the plug 37 from the opening 39.

Of course, a variety of devices are suitable for controlling the outflow of material from the reservoir 35. A plug 37 is shown for ease of illustration. However, those skilled in the art will understand that other devices can be used for this purpose. It should also be noted that it is not necessary that anything be used to control the outflow of material from the reservoir 35. For example, a ribbon could be wiped while disposing the apparatus 10 over a suitable waste receptacle (not shown) such that the removed material would immediately flow from the channel 31 through the opening 33 into the receptacle. Since the opening 33 is disposed below edges 36 and 46, most of the wiping action occurs above the opening 33, which will cause the removed material to be directed through the opening 33 and into the reservoir 35.

It will be understood by those skilled in the art that the present invention has been described with reference to certain embodiments, but that the present invention is not limited to those embodiments. The embodiment shown in FIGS. 1–5 is only intended to illustrate an exemplary embodiment of the ribbon cleaning apparatus of the present invention. Those skilled in the art will understand that many variations can be made to the embodiments discussed above and that all such variations are within the scope of the present invention. The present invention is not limited to any particular physical design or configuration, except that whatever design or configuration is used should remove foreign material from the surface of the ribbon while maintaining the ribbon in a substantially flat configuration.

Figure 6:
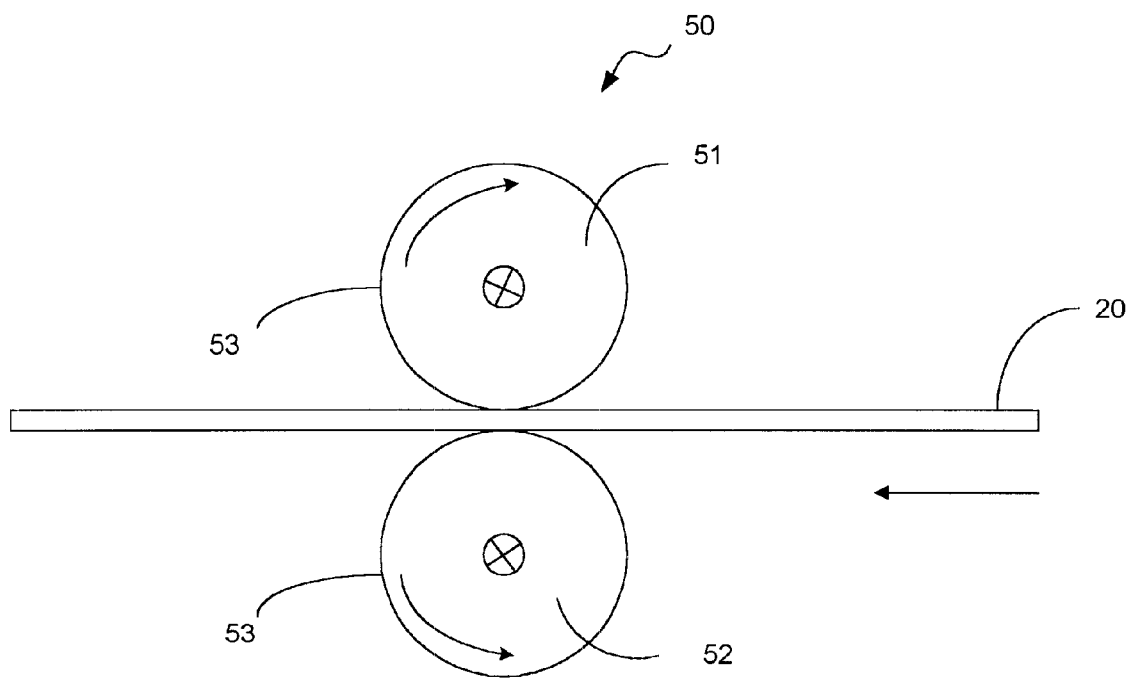
FIG. 6 is a side view of an alternative embodiment of the optical fiber ribbon cleaning apparatus of the present invention.

For example, one alternative design of the ribbon cleaning apparatus of the present invention is illustrated in FIG. 6. The apparatus 50 comprises first and second elements 51 and 52 that each include a cleaning surface 53. The elements 51 and 52 are rotatably mounted on the apparatus 50 by a mechanical coupling device (not shown) and are separated by a predetermined distance. The elements 51 and 52 have generally circular or cylindrical cross-sections. The predetermined distance is slightly less than the thickness of the optical fiber ribbon.

When an optical fiber ribbon 20 is disposed between the first and second elements 51 and 52, as illustrated in FIG. 6, portions of the first and second elements 51 and 52 are in contact with ribbon 20. As the ribbon 20 is pulled through the device in the longitudinal direction of the ribbon 20, the contact between the cleaning surface 53 and the ribbon 20 effectuates removal of foreign material from the exterior surfaces of the ribbon 20. Those skilled in the art will achieve these goals. As will be understood by those skilled in the art, all such designs are within the scope of the present invention.

What is claimed is:

1. An apparatus for removing foreign material from exterior surfaces of an optical fiber ribbon cable, the apparatus comprising:
   a first element, the first element having an upper surface, a front end, and a rear end, the upper surface comprising a first wiping member, the first wiping member adapted for receiving an optical fiber ribbon thereon and for maintaining the optical fiber ribbon substantially flat as the optical fiber ribbon is pulled over the first wiping member, wherein as the ribbon is pulled over the first wiping member, the contact between the first wiping member and the ribbon causes foreign material to be removed from the ribbon, wherein the first wiping member is a channel integrally formed in the upper surface of the first element, the channel having a substantially flat bottom surface, the channel extending from the front end of the first element to the rear end of the first element, the channel including first and second sides, the first and second sides extending in a direction away from the bottom surface of the channel such that the sides and bottom surface of the channel form a generally U-shape;

a second element, the second element including a bottom surface, a front end and a rear end, wherein when the apparatus is placed in an operative position, a portion of the bottom surface of the second element covers the channel, wherein when an optical fiber ribbon cable is disposed in the channel and the apparatus is placed in an operative position, the exterior surfaces of the optical fiber ribbon cable are in contact with the channel and with said portion of the bottom surface of the second element, and wherein when the ribbon cable is pulled through the channel in a longitudinal direction of the ribbon cable, the contact between the channel and the ribbon cable and the contact between said portion of the bottom surface of the second element and the ribbon cable effectuate removal of foreign material from the exterior surfaces of the ribbon cable;

an opening formed in the bottom surface of the channel, the opening extending through the first element, the opening having a first side and a second side, the second side of the opening being farther from the front end of the first element than the first side of the opening is from the front end of the first element, the first side of the opening being farther from the rear end of the first element than the second side of the opening is from the rear end of the first element, wherein when foreign material is removed from the optical fiber ribbon cable, the foreign material passes out of the channel through the opening; and wherein the first and second sides of the channel are equal in height along the length of the channel, and wherein said portion of the bottom surface of the second element comprises a cleaning surface and a non-cleaning surface, the channel having a first depth over a first portion of the channel and the channel having a second depth over a second portion of the channel, the first portion of the channel extending from the front end of the first element to the first side of the opening formed in the channel, the second portion of the channel extending from the second side of the opening formed in the channel to the rear end of the first element, the cleaning surface comprising an edge disposed above the second side of the opening, the non-cleaning surface extending from the front end of the first element to the second side of the opening, wherein the first depth of the channel is greater than the second depth of the channel and wherein when a ribbon is pulled through the channel, the non-cleaning surface does not come into contact with the exterior surface of the ribbon cable and wherein the edge of the cleaning surface comes into contact with the exterior surface of the ribbon, the contact between the edge of the cleaning surface and the exterior surface of the ribbon cable and the contact between the channel and the exterior surface of the ribbon cable causing foreign material to be wiped, or scraped, from the exterior surface of the ribbon cable.

2. The apparatus of claim 1, wherein at least a portion of the first wiping member is comprised of a material that is capable of conforming to surface variations existing in the exterior surfaces of the optical fiber ribbon.

3. The apparatus of claim 1, further comprising:

a coupling device, the first and second elements being coupled together by the coupling device, wherein the coupling device maintains the first and second elements in predetermined positions with respect to the longitudinal direction of the ribbon cable when the apparatus is placed in the operative position.

4. The apparatus of claim 3, wherein the coupling device is a hinging mechanism, the hinging mechanism allowing the second element to be moved in a hinging relationship with respect to the first element.

5. The apparatus of claim 3, wherein the coupling device comprises a magnetic material located on the first and second elements, the magnetic material located on the first element having a polarity that is opposite a polarity of the magnetic material located on the second element, the magnetic material on the first and second elements capable of maintaining the first and second elements in the operative position.

6. The apparatus of claim 1, further comprising:

a reservoir formed in the first element, the reservoir being in communication with the opening formed in the channel, wherein foreign material that passes out of the channel through the opening is received in the reservoir, the reservoir holding the foreign material received therein.

7. The apparatus of claim 6, further comprising:

a mechanism disposed in a wall of the reservoir for controlling outflow of foreign material from the reservoir.

8. The apparatus of claim 7, wherein the mechanism for controlling the outflow of foreign material from the reservoir is a plug that is adapted to plug an opening formed in said wall of the reservoir, wherein the plug is inserted into the opening formed in said wall of the reservoir to prevent the outflow of foreign material from the reservoir, and wherein removal of the plug from the opening formed in said wall of the reservoir enables foreign material to flow out of the reservoir.

9. The apparatus of claim 1, wherein the cleaning surface protrudes in a step-like manner from said portion of the bottom surface of the second element and wherein the non-cleaning surface is coplanar with the bottom surface of the second element, the first depth being greater than the thickness of the ribbon, the second depth being slightly less than the thickness of the ribbon, and wherein the entire cleaning surface is in contact with the ribbon when the apparatus is in the operative position and the ribbon is pulled through the channel.

10. An apparatus for removing foreign material from exterior surfaces of an optical fiber ribbon, the apparatus comprising:

a first element, the first element including a cleaning surface, the first element having a generally circular cross-section and being rotatably mounted on said apparatus;

a second element, the second element including a cleaning surface, the second element having a generally circular cross-section and being rotatably mounted on said apparatus, wherein when an optical fiber ribbon is disposed between the first element and the second element, the exterior surfaces of the optical fiber ribbon are in contact with a portion of the cleaning surface of the first element and with a portion of the cleaning surface of the second element, the first and second elements being mounted such that the portions of the cleaning surfaces that are in contact with the ribbon are separated by a distance, the distance being measured along an axis including the portions of the cleaning surfaces that are in contact with the ribbon and equal to or slightly less than the thickness of the optical fiber ribbon, and wherein when the ribbon is pulled through the apparatus in a longitudinal direction of the ribbon, the portions of the cleaning surfaces that are in contact with the ribbon effectuate removal of foreign material from the exterior surfaces of the ribbon.

11. An apparatus for removing foreign material from exterior surfaces of an optical fiber ribbon cable, the apparatus comprising:

a first element, the first element having an upper surface, a front end, and a rear end, the upper surface comprising a first wiping member, the first wiping member adapted for receiving an optical fiber ribbon thereon and for maintaining the optical fiber ribbon substantially flat as the optical fiber ribbon is pulled over the first wiping member, wherein as the ribbon is pulled over the first wiping member, the contact between the first wiping member and the ribbon causes foreign material to be removed from the ribbon; wherein the first wiping member is a channel integrally formed in the upper surface of the first element, the channel having a substantially flat bottom surface, the channel extending from the front end of the first element to the rear end of the first element, the channel including first and second sides, the first and second sides extending in a direction away from the bottom surface of the channel such that the sides and bottom surface of the channel form a generally U-shape;

a second element, the second element including a bottom surface, a front end and a rear end, wherein when the apparatus is placed in an operative position, a portion of the bottom surface of the second element covers the channel, wherein when an optical fiber ribbon cable is disposed in the channel and the apparatus is placed in an operative position, the exterior surfaces of the optical fiber ribbon cable are in contact with the channel and with said portion of the bottom surface of the second element, and wherein when the ribbon cable is pulled through the channel in a longitudinal direction of the ribbon cable, the contact between the channel and the ribbon cable and the contact between said portion of the bottom surface of the second element and the ribbon cable effectuate removal of foreign material from the exterior surfaces of the ribbon cable;

an opening formed in the bottom surface of the channel, the opening extending through the first element, the opening having a first side and a second side, the second side of the opening being farther from the front end of the first element than the first side of the opening is from the front end of the first element, the first side of the opening being farther from the rear end of the first element than the second side of the opening is from the rear end of the first element, wherein when foreign material is removed from the optical fiber ribbon cable, the foreign material passes out of the channel through the opening;

a reservoir formed in the first element, the reservoir being in communication with the opening formed in the channel, wherein foreign material that passes out of the channel through the opening is received in the reservoir, the reservoir holding the foreign material received therein; and a mechanism disposed in a wall of the reservoir for controlling outflow of foreign material from the reservoir.

* * * * *